July 2, 1935.   G. H. McCOY ET AL   2,006,471
SEPARATION APPARATUS
Original Filed June 26, 1930
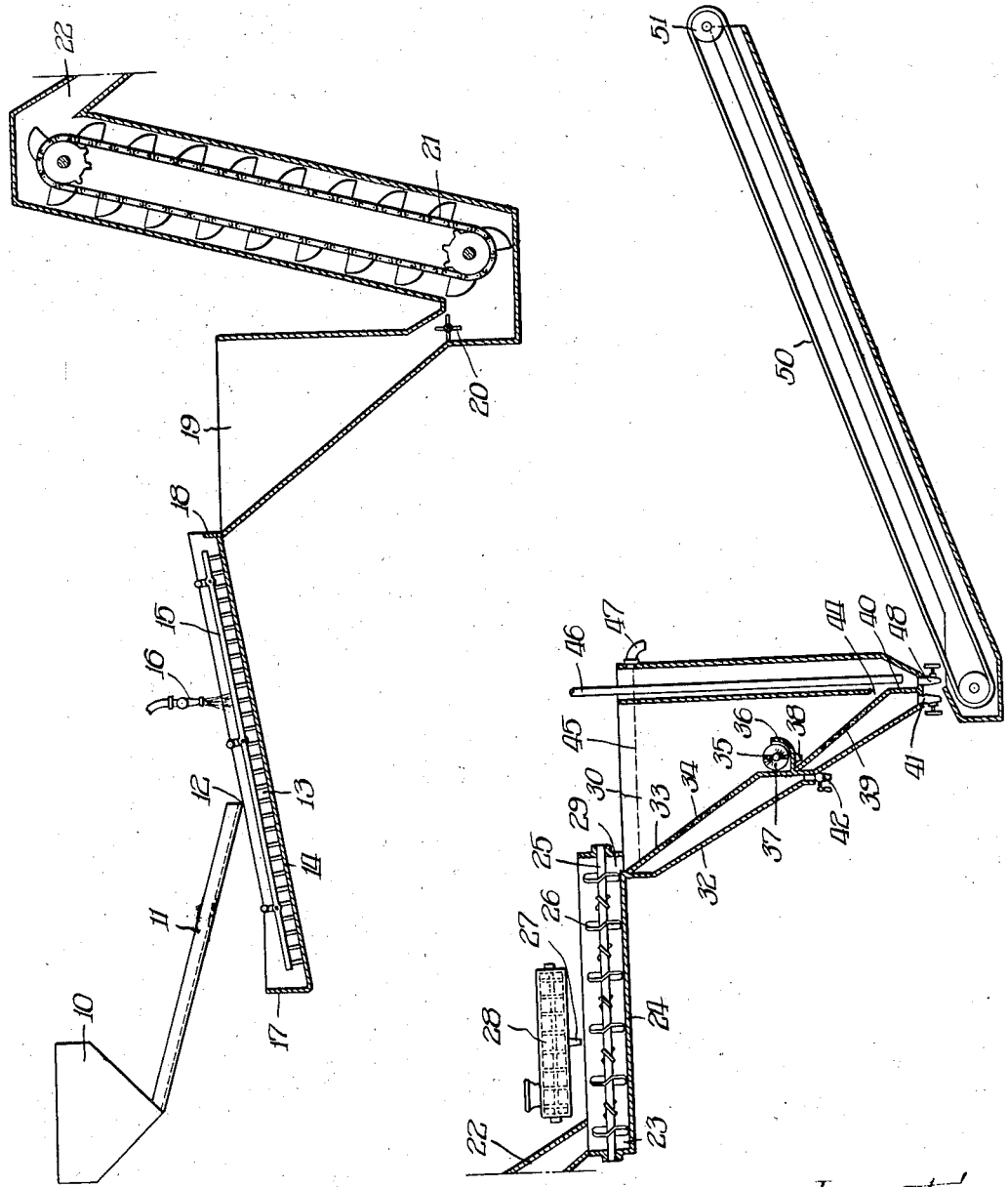
Inventors:
George H McCoy,
David M Wright,
J. Parkey Hall,
By Wilkinson, Huxley, Byron & Knight
Attys Patented July 2, 1935

2,006,471

UNITED STATES PATENT OFFICE 2,006,471

SEPARATION APPARATUS

George H. McCoy, David M. Wright, and Jesse Pankey Hall, Bartow, Fla., assignors to Swift & Company Fertilizer Works, Chicago, Ill., a corporation of Delaware Original application June 26, 1930, Serial No. 463,984. Divided and this application March 16, 1934, Serial No. 715,892

7 Claims. (Cl. 209—273)

This invention relates to a novel and improved apparatus adapted for use in recovering phosphatic materials.

Phosphate rock, or calcium phosphate, as it is known chemically, has various uses in industry, one of which is for the production of superphosphate in the manufacture of fertilizer. Phosphate rock exists in natural deposits in certain localities and is obtained by a mining process. As it is removed from the ground, it exists mixed with impurities such as sand and clay and is usually of varying physical size, ranging from the size of ordinary gravel down to minute particles about the size of sand particles.

By a mechanical process, such as screening and the like, the larger particles can be readily separated and recovered without difficulty and heretofore it has been the practice to run the mined material through a screen of approximately twenty mesh and to discard all of the smaller or undersized portion thereof as waste.

It has been known however, that a relatively large portion of the rock phosphate exists as small particles, about the size of ordinary sand, or smaller, and therefore, a relatively high percentage of the rock phosphate passes through the twenty mesh screen and is discarded with the waste material.

Accordingly, applicants have invented a process by which the rock phosphate material which has formerly been discarded as waste, may be separated from the sand and foreign material and recovered for use. This process is described in applicants' copending application Serial No. 463,984, filed June 26, 1930, and of which application, this application is a division. This application covers the novel apparatus disclosed, but not claimed in said copending application.

It is an object of this invention to provide simple and inexpensive mechanism for the recovery of such material which may be operated with a high degree of success, without requiring highly trained or skilled labor or unusual care in practice.

These and other objects not specifically enumerated will readily appear to one skilled in the art as the following description proceeds.

In describing the apparatus reference will be made to the process steps of said copending application, as the apparatus provides a preferred means for practicing said process.

After the initial screening operation above referred to, by which the larger or pebble size particles of rock phosphate are recovered, under the process of said copending application, the under-sized portion of the mined material is next subjected to a washing operation, during which a large portion of the dirt, sand and other foreign material is removed. The remaining washed material which is a mixture of sand and rock phosphate of about equal size, is then conveyed to a mixer, where it is mixed with an agglomerating substance. The agglomerating substance may be of any suitable kind, it being necessary however, that the material have the joint properties of, first, an affinity for the rock phosphate and not the sand particles, and, secondly, as applied to the rock phosphate particles, to such particles to adhere together by agglomeration, to form the smaller particles of rock phosphate into larger agglomerated particles, for a purpose hereinafter more specifically set forth.

The invention is not limited to any particular agglomerating agent, as any substance known to exhibit the properties referred to, will serve satisfactorily, but in practice, the agglomerating agent is preferably an emulsion of soap and oil, such as for instance, any kind of cheap mineral oil, such as fuel oil, and any fatty acid or rosin soap, preferably the former, of a cheap grade. These products are emulsified in a suitable apparatus with a small quantity of water, which is added thereto.

After the mixing process referred to, it will be found that the rock phosphate particles are agglomerated and exist in larger physical form than the particles of sand. The mixture is then fed forward and deposited onto an apparatus which is effective to mechanically separate the particles on the basis of their size, such as for instance, by passing over a screen which will permit the smaller sand particles to fall through and the larger agglomerated particles of rock phosphate to pass over the screen.

In further practicing the process, after an initial separation has been accomplished as above described, the agglomerated particles may be again mixed and broken up and allowed to agglomerate a second time, all for the purpose of freeing any particles of sand or other impurities which may have been entrapped in the agglomerated particles in the first instance. After this operation, a second separation may be effected in the same manner, such as by passing over a second screen. This second step, is a refinement process and makes for a more purified final product. After the above described separating action, the sand and other impurities, may be discarded and the agglomerated phosphatic material collected and prepared for further treatment.

It may be desirable, after the second separating action, to reintroduce the waste material for treatment for the purpose of recovering any phosphatic material that may have passed through with the waste in the second separating action. This may or may not be desirable, depending upon the results obtained in the first treatment. If it is found that the mixing action of the agglomerated phosphatic material for the purpose of releasing the entrapped impurities, acts to break up the agglomerated material to an extent to permit the same to pass through with the impurities and sand in the second separating action, applicants' invention contemplates a reintroduction and processing of this waste material to recover and secure a higher yield of phosphatic material.

The essential feature of this process, is that of agglomerating the phosphatic material and not the sand and impurities and taking advantage of the difference in the physical size of the respective materials as they exist in this form and effecting mechanically, a separation of the phosphatic material from the sand and impurities, by means effective to separate particles of different size.

With the above process in mind, the novel apparatus of this invention will now be described.

By referring to the drawing, one preferred apparatus of this invention will now be described.

Figure 1 of the drawing, is a diagrammatic representation of one half of the apparatus, contemplated in this invention, and Figure 2 shows the remaining half, the entire apparatus being disclosed when Figure 2 is placed at the right hand end of Figure 1.

By referring to the figures of the drawing, it will be noted that the present invention is illustrated as embodied in an apparatus which consists of a dewatering box 10, on the washer which is in the form of a hopper or container which receives the under-sized particles as they pass through the screen in the first screening operation. As above described, this invention is employed for the treatment of that portion of the mined material which is discarded in the recovery of pebble sized material and coarse phosphate sand. The material next passes from the dewatering box 10, by a suitable conveyor, such as the chute 11, into an intermediate portion as at 12, of a classifier such as the rake classifier 13.

This classifier comprises an inclined trough 14, having an oscillating rake conveying means 15, located therein mounted and connected to produce the desired mechanical movement. Water is introduced into the classifier by means of a pipe 16, at substantially the location shown, whereby water, in flowing down the incline, moves in a direction opposed to the upward movement of the material as conveyed by the action of the rake conveyor. This apparatus is effective to wash the material free of a large portion of the dirt, silt and other impurities which may become suspended in the water, which passes in contact therewith. Such suspended material is caused to overflow at 17, the low end thereof.

The washed material is then caused to pass out of the upper end 18 of the classifier and fall into a bin 19, positioned to receive the same. The bin is provided with an inclined floor, so that the material therein will feed to the lower end where it encounters an automatic feeder 20, which causes predetermined portions thereof to be discharged from the bin and fed to the conveyor buckets of a conveyor or elevator 21.

The conveyor may be of any suitable construction and therefore is only shown diagrammatically and will not be described in detail here. In any event, the material is conveyed by the conveyor or elevator to the elevated position and discharged into the chute 22, and into the mixer 23, at the left hand end thereof, as shown in the drawing.

The mixer 23, comprises a trough 24, in which two rotary shafts 25, are mounted, one beside the other, on which shafts radially disposed blades 26, are mounted having inclined faces thereon, of a construction suitable for conveying the material through the mixer from left to right, as shown in the drawing.

As the material is conveyed through the mixer referred to, it is caused to be agitated and intimately mixed with the agglomerating material, which is introduced as at 27, from the emulsifier 28. The emulsifier likewise may be of any suitable construction and therefore the specific details thereof will not be given herein.

The emulsifier is preferably a suitable mechanism which will be operable to produce an emulsion of an oil such as a cheap fuel oil, and a suitable soap, such as a fatty acid or rosin soap, preferably of a cheap character.

A suitable quantity of water is also introduced into the emulsifier and is mixed into the emulsion. The quantity of emulsion introduced into the mixture, may be varied according to different conditions and according to the results desired, but that quantity should be introduced which will be effective to agglomerate the phosphatic material to an extent sufficient to permit its mechanical separation on the basis of its physical size.

After the mixture is so treated, the material is discharged from the end 29, of the mixing apparatus and is fed into the separator 30, which will now be described.

The separator in the present illustration, comprises a tank 31, which is preferably of the construction shown, namely, of a general triangular shape, from the side view, having an inclined bottom 32. The tank is provided with an inclined surface 33, and a stationary screen 34, which is mounted spaced above the floor 32. The screen extends downwardly at about the same angle as the floor and terminates in a mixing and breaking device 35. A partition 37, is provided, extending vertically from the floor, on the upside of which a valve outlet 42 is provided for the discharge of tailings as waste. The mixer referred to, comprises a semi-cylindrical trough 36, having its upper edge connected with the lower end of the screen, whereby it serves as a gutter for receiving the material which falls off of the lower end of the screen 34. The trough 36 is provided with a shaft mounted therein, on which mixing and breaking blades of any suitable construction are mounted for engagement with the collected material and for producing a joint breaking, mixing and conveying action thereon.

The trough may be provided with a series of outlet openings 38, spaced apart along the width of the apparatus, that is, transversely of the tank 31, through which the material in the trough 36 may be discharged. It will be apparent that the conveyors may be arranged so as to convey the material collected in any particular space between outlet openings toward a particular outlet opening, so that the result will be that the material caught in the trough will be agitated, broken, and conveyed laterally and finally discharged through one of the outlet openings 38, onto the lower screen 39, which is disposed on an incline, in the same manner as the upper screen 34.

In practice therefore, the agglomerated particles which do not pass through the upper screen, are caused to fall into the mixer, where they are broken up and reagglomerated and are subsequently passed over the lower screen. This effects a release and final separation of any particles of sand and other impurities which may have been caught or entrapped in the agglomerated material. At the lower end of the screen 39, a vertical partition 40 is disposed at the upper side of which, a second outlet valve 41 is provided, for discharging the waste sand which passes through the screen.

As above mentioned in connection with the description of the process, if it is found that this material contains sufficient phosphatic material, it may be worked over for the purpose of recovering such material.

The tank is further provided with a vertical partition 43, which extends from the top thereof, downwardly toward the partition 40, but spaced therefrom to provide the opening 44, through which the phosphatic material passes from the lower end of the screen 39.

The tank 41 is kept full of water up to approximately the level, represented by the level line 45, the water being fed thereto through a pipe 46, which discharges at the location of the bottom of the tank. An overflow pipe 47 is also provided which guarantees a constant level of water therein.

As the phosphatic material falls from the lower screen, 39, it passes to the lower portion of the tank 31, and accumulates at the location of the discharge spigot 48 which may be controlled to discharge the contents of the tank onto a suitable means for conveying it away for treatment, storage or shipment.

This material will of course, have a certain quantity of water mixed therewith, but it is found in practice, that the accumulated material at the location of the spigot, is effective to substantially seal the tank against a large discharge of water so that the preponderance of the discharge is that of phosphatic material. The material however, being quite moist or semi-fluid in character is capable of being conveyed by means of a pump or any other conveyor such as is represented in the drawing by the drag elevator 50. This elevator is of ordinary construction and will not be described in detail, it being merely understood that the conveyor permits the liquid portion, such as the water, to flow off of the material and the material to be discharged at its upper end 51 into bins, railroad cars or other conveyors as desired.

An alternative method would be to pump the material to a higher elevation into an apparatus such as a cone classifier in which the water is separated from the material and passes back to the apparatus for re-use.

It has been found in practice that the screens of the present apparatus require cleaning from time to time in order to free the wire mesh of material which accumulates thereon and impairs the separating operation. The applicants have discovered that the screens may be kept clean if a quantity of kerosene is introduced into the agglomerated mixture of phosphatic materials and impurities while being treated in the mixture. It is not essential to introduce kerosene continuously but merely periodically in such quantity as is sufficient to adequately clean the screen of the material collected thereon. The quantity of kerosene may be varied and governed according to the nature of the material and the condition of the screen, which will vary somewhat according to the period selected for the cleaning action. One of the advantages of the process of said copending application is that it is capable of performing the separating action by a continuous process, which process may be continuously maintained by the hereindescribed cleaning operation. The periodic introduction of kerosene for cleaning the screen is found to maintain the screen clean and entirely free of accumulated materials at all times whereby the apparatus may be continuously operated with substantially the same results throughout. This, of course, eliminates the otherwise necessary procedure of periodically shutting down for the purpose of cleaning the screen.

The form of invention illustrated herein is not to be considered as limiting the invention in any respect, as the scope of the invention may be determined from the appended claims and an understanding of the present disclosure with an appreciation of the advantages which the invention produces therein.

We claim:

1. An apparatus of the character described comprising, a receptacle, means for maintaining substantially a constant level of water in said receptacle, a pair of angularly disposed screens mounted in said receptacle and below the water level, and a breaking device located between said screens, one of said screens being arranged to discharge material onto said breaking device and the other of said screens being arranged to receive material discharged from said breaking device.

2. An apparatus of the character described comprising, a receptacle, means for maintaining substantially a constant level of water in said receptacle, a pair of angularly disposed screens mounted in said receptacle below the water level, and a breaking device mounted in said receptacle below the water level, the first of said screens being disposed above said breaking device so that material which passes over said screen will be supplied to said breaking device and the second of said screens being mounted below said breaking device and adapted to receive material discharged therefrom.

3. An apparatus of the character described comprising, a receptacle, means for maintaining substantially a constant level of water in said receptacle, a pair of angularly disposed screens mounted in said receptacle below the water level, and a breaking device mounted in said receptacle below the water level, the first of said screens being disposed above said breaking device so that material which passes over said screen will be supplied to said breaking device and the second of said screens being mounted below said breaking device and adapted to receive material discharged therefrom, and means below said screens for receiving and discharging material which passes through said screens.

4. An apparatus of the character described comprising, a receptacle, means for maintaining substantially a constant level of water in said receptacle, a pair of angularly disposed screens mounted in said receptacle below the water level, and a breaking device mounted in said receptacle below the water level, the first of said screens being disposed above said breaking device so that material which passes over said screen will be supplied to said breaking device and the second of said screens being mounted below said breaking device and adapted to receive material discharged therefrom, and means below said screens for receiving and discharging material which passes through said screens, and means within said receptacle for receiving and discharging material which passes over said screens.

5. An apparatus of the character described comprising, a receptacle, means for maintaining substantially a constant level of water in said receptacle, a pair of angularly disposed screens mounted in said receptacle below the water level, and a breaking device mounted in said receptacle below the water level, the first of said screens being disposed above said breaking device so that material which passes over said screen will be supplied to said breaking device and the second of said screens being mounted below said breaking device and adapted to receive material discharged therefrom and means below said screens for receiving and discharging material which passes through said screens, and means within said receptacle for receiving and discharging material which passes over said screens, all of said receiving and discharging means being constructed to prevent the passing of appreciable quantities of water during the discharge of material therefrom.

6. An apparatus of the character described comprising, a receptacle, means for maintaining substantially a constant level of water in said receptacle, a pair of angularly disposed screens mounted in said receptacle below the water level, and a rotary breaking device mounted in said receptacle below the water level and adapted to break up agglomerated material and permit the reagglomeration thereof, the first of said screens being disposed above said breaking device so that material which passes over said screen will be supplied to said breaking device and the second of said screens being mounted below said breaking device and adapted to receive material discharged therefrom.

7. An apparatus of the character described comprising, a receptacle, means for replenishing and maintaining substantially a constant level of water in said receptacle, a pair of angularly disposed screens mounted in said receptacle below the water level, and a breaking device mounted in said receptacle below the water level, the first of said screens being disposed above said breaking device so that material which passes over said screen will be supplied to said breaking device and the second of said screens being mounted below said breaking device and adapted to receive material discharged therefrom.

GEORGE H. McCOY.
DAVID M. WRIGHT.
J. PANKEY HALL.